United States Patent [19]

Yamaguchi et al.

[11] Patent Number: 4,999,477
[45] Date of Patent: Mar. 12, 1991

[54] RESISTANCE MEASURING MECHANISM IN A RESISTANCE WELDING MACHINE

[75] Inventors: Teruzo Yamaguchi; Tatsuo Morita, both of Tokyo, Japan

[73] Assignee: Obara Corporation, Tokyo, Japan

[21] Appl. No.: 558,802

[22] Filed: Jul. 27, 1990

[51] Int. Cl.$^5$ .............................................. B23K 11/25
[52] U.S. Cl. .................................... 219/110; 219/109
[58] Field of Search ................................. 219/109, 110

[56] References Cited

U.S. PATENT DOCUMENTS

| 4,647,751 | 3/1987 | Yoshimura et al. | 219/109 |
| 4,734,640 | 3/1988 | Kitahori et al. | 219/109 |

FOREIGN PATENT DOCUMENTS 61-189882 8/1986 Japan .

Primary Examiner—Clifford C. Shaw
Attorney, Agent, or Firm—Flynn, Thiel, Boutell & Tanis

[57] ABSTRACT

There is disclosed a resistance measuring mechanism in a resistance welding machine for calculating a resistance value in an arbitrary portion of the resistance welding machine. The resistance measuring mechanism comprises means for detecting temperature of an exit through which cold water for cooling a cable flows and the temperature of parts of cables, means for detecting voltage at a secondary or a primary winding of a welding transformer and means for detecting welding current at the secondary or the primary winding of the welding transformer characterized in that resistance value at a measuring temperature is calculated by correcting the resultant detected temperature, voltage, welding current for voltage, welding current at a reference temperature.

4 Claims, 3 Drawing Sheets 4,999,477

RESISTANCE MEASURING MECHANISM IN A RESISTANCE WELDING MACHINE

BACKGROUND OF THE INVENTION

1. Field of the Invention:

The present invention relates to a resistance measuring mechanism in a resistance welding machine for calculating a substantial resistance value by detecting voltage, welding current, temperature at an arbitrary portion of the resistance welding machine.

2. Description of the Prior Art:

It is necessary to calculate a substantial resistance value for detecting deteriortion of a cable or wearing of tip and the like in a welding machine. The resultant resistance value has been conventionally detected by calculating voltage as well as welding current between both ends of the cable or tips, e.g. as explained in Japanese Patent Laid-Open Publication No. 61-189882.

However, there arises a problem to judge the deterioration of the cable and the like (welding apparatus as a whole including welding gun) in a practical extent on the basis of the calculated resistance value although it is possible to calculate the resistance value of the cable and the like with high accuracy based on the values of the voltage and the welding current. That is, an electric resistance of a conductor such as a copper wire in general used in the cable and the like is varied depending on the temperature of the conductor. The temperature of the conductor is varied depending on the cold water for cooling the cable and the like at seasons, times or places where cold water is used. Furthermore, the temperature of the conductor increases at the weld time and the rate of increase of the temperature depends on the current value, amount and temperature of the cold water, timing of measuring the temperature of the conductor, etc.

Hence, in the conventional method for calculating the resistance value of the cable and the like on the basis of only the voltage and current values, the resistance value is affected by variation of resistance due to deterioration of the cable and variation of temperature of the conductor, which entails to create problem.

SUMMARY OF THE INVENTION

The present invention has been made to solve the problem set forth above.

It is therefore an object of the present invention to provide a resistance measuring mechanism capable of substantially calculating the resistance value taking into consideration the variation of resistane caused by deterioration of the cable and the like with practical precision extent so that the resultant calculated resistance value is displayed or resultant decision or judgement of the deterioration of the cable and the like is output.

To achieve the object set forth above, the present invention is to provide a resistance measuring mechanism in a resistance welding machine comprising means for detecting the temperature of an exit through which the cold water for cooling a cable and the like flows and the temperature of portion of the cable, means for detecting voltage at a secondary or a primary winding of a welding transformer and means for detecting current at the secondary or the primary winding of the welding transformer characterized in that the resistance value at a portion of the resistance welding machine where the voltage is detected at the measuring temperature is calculated by correcting the resultant detected temperature, voltage, welding current for voltage, welding current at a reference temperature.

There is also provided means for judging deterioration of the cable and the like when the calculated resistance value exceeds a predetermined value.

The resistance measuring mechanism and the means for judging deterioration of the cable are incorporated in the resistance welding control unit.

DESCRIPTION OF THE PREFERRED EMBODIMENT

Figure 1:
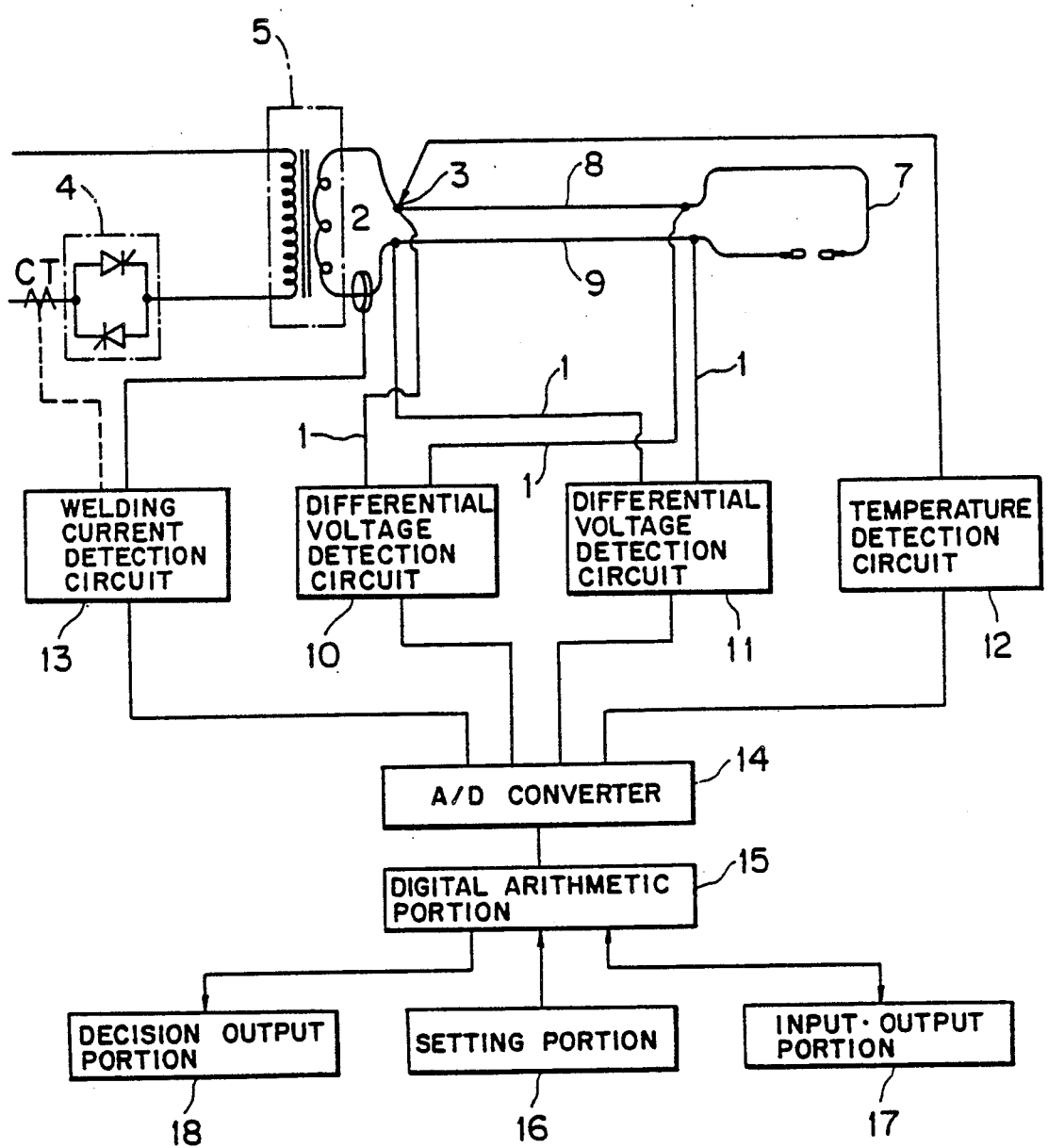
FIG. 1 is a block diagram of a welding machine provided with a resistance measuring mechanism according to a first of the present invention.

First Embodiment (FIG. 1)

A resistance measuring mechanism in a resistance welding machine according to a first embodiment of the present invention will be described with reference to FIG. 1.

The resistance mechanism comprises means for detecting the temperature of an exit thorugh which cold water for cooling cables 8, 9 and the like is cooled and the temperature of portion of the cables 8, 9, means for detecting voltage at a secondary or a primary winding of a welding tranformer 5 and means for detecting current at the secondary or the primary winding of the welding transformer 5 characterized in that the resistance value at a portion of the resistance welding machine where the voltage is detected at the measuring temperature is calculated by correcting the resultant detected temperature, voltage, welding current for voltage, welding current at a reference temperature.

The resistance measuring mechanism will be described more in detail.

Designated at 1, 1 are leads for detecting voltage at the weld time, 2 is a toroidal coil for detecting the welding current, 3 is a temperature detector for detecting temperature of an exit through which cold water flows. Designated at 4 is an inversed parallel thyristor connected to a power frequency power source and disposed in the primary circuit of the welding transformer 5 and a resistance welding machine 7 is disposed at the secondary winding.

The leads 1, 1 are disposed between both ends of cables 8, 9 respectively each arm of the resistance welding machine 7 and differential voltage detecting circuits 10, 11. The temperature detector 3 disposed at the end of the cable 8 guides the detected temperature of the cold water to a temperature detecting circuit 12. The toroidal core 2 disposed at the secondary winding of the welding transformer 5 guides the detected welding current to a current detecting circuit 13. An analog to digital converter (hereinafter referred to as A/D converter) 14 receives differential voltages supplied from the differential voltage detecting circuits 10, 11, the temperature supplied from the temperature detecting circuit 12 and the welding current supplied from the current detecting circuit 13. The A/D converter 14 converts the analog data of the detected voltage, temperature, welding current to digital data thereof which are supplied to a digital arithmetic portion 15. The digital arithmetic portion 15 receives deterioration data ranging from upper to lower limit thereof (represented by %) which is recognized as deterioration of the cable on the basis of predetermined resistance value or the resistance value of a new cable which is just after replaced with the old cable as well as data for calculating the resistance value on the basis of the resistance value, voltage and welding current at a reference temperature respectively from a setting portion 16.

Accordingly, in the digital arithmetic portion 15, the digital data of the temperature, voltage, welding current supplied by the A/D converter 14 is subjected to an arithmetic operation as the resistance value at the reference temperature. The resistance value is displayed on an input output portion 17. The resistance value thus obtained at the digital arithmetic portion 15 is decided as deterioration (anomaly) or not by the digital arithmetic portion 15 and the resultant decision is supplied to a decision output portion 18. The leads 1, 1 may be connected between both ends of the tips, or to both ends of the secondary winding or primary winding of the welding transformer although they are connected between each end of the cable in the first embodiment. The toroidal core 2 may be provided at the primary winding of the welding transformer instead of at the secondary winding. The thyristor may be replaced by an inverter.

Figure 2:
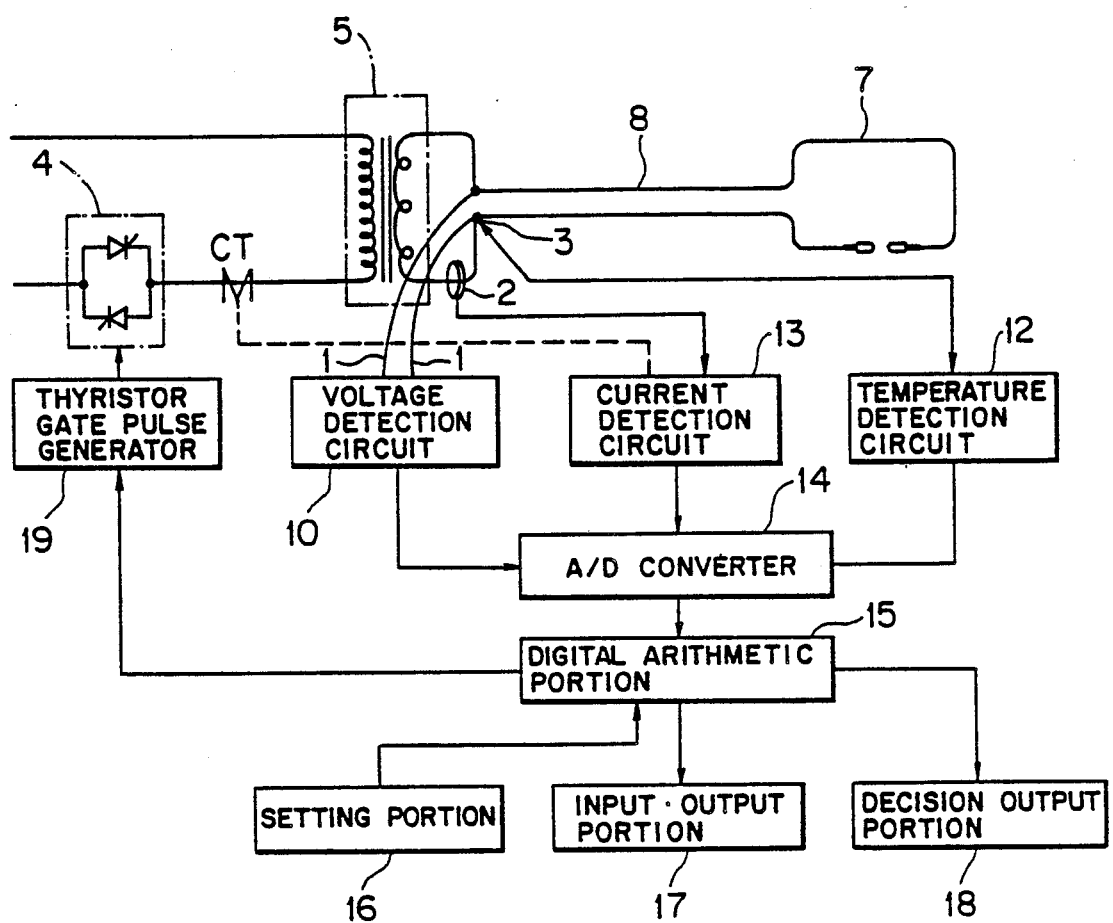
FIG. 2 is a block diagram of a welding machine provided with a resistance measuring mechanism according to a second of the present invention.

Second Embodiment (FIG. 2)

A resistance measuring mechanism according to a second embodiment will be described with reference to FIG. 2. Constituents same as those of the first embodiment are designated at same numerals as those of the first embodiment and the explanation thereof are omitted.

The leads 1, 1 are connected to both ends of the secondary winding of the welding transformer 5. Hence, according to the second embodiment, the resistance value at the entire secondary winding (entire welding machine including the cable and the welding gun) can be measured. Inasmuch as the setting portion 16 stores data for controlling a constant current which data is supplied to the digital operation portion 15, the digital arithmetic portion 15 issues a signal for controlling the constant current in addition to the function given in the first embodiment. When the same signal is supplied to a thyristor gate pulse generator 19, the thyristor gate pulse generator 19 controls the thyristor 4 for thereby automatically supplying constant current.

Figure 3:
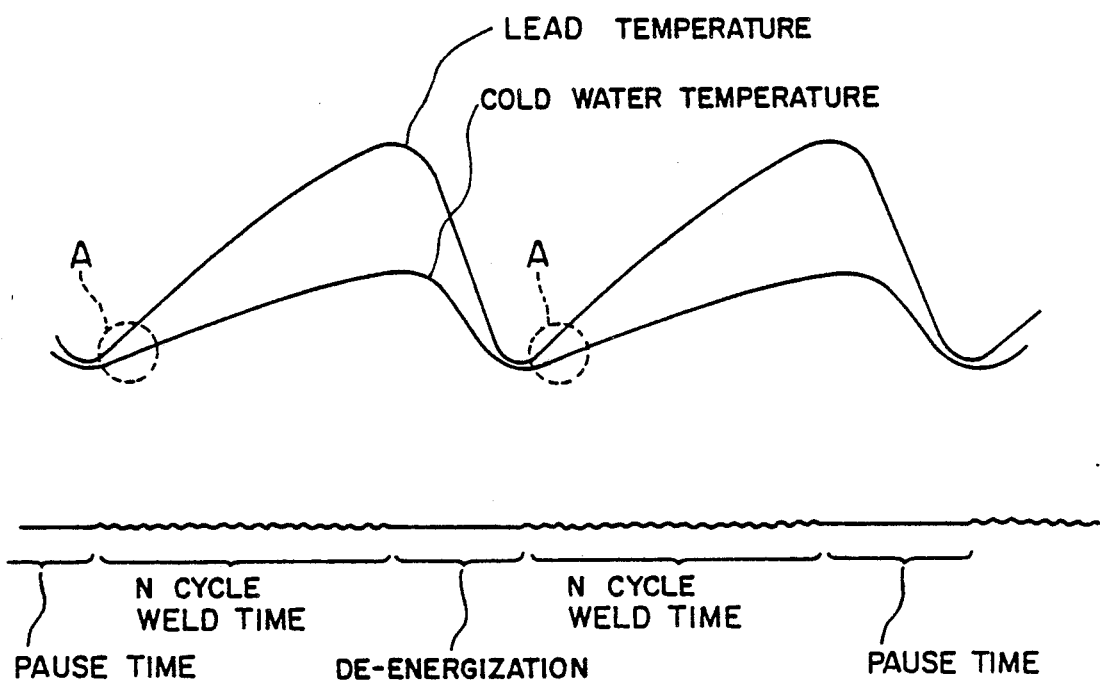
FIG. 3 is a view showing a relationship between temperature of the cold water for cooling a cable and temperature of the cable at a weld time.

FIG. 3 is a schematic view showing relationship between the temperature of the cold water and a copper wire of the cable.

One time welding operation completes at the N-cycles weld time and thereafter the welding operation enters into a pause time. The temperature of the copper wire constituting the cable increases in proportion to magnitude of the welding current and the weld time for supplying the welding current when the welding current is supplied to the cable for the next N-cycles weld time and decreases abruptly due to cooling thereof by the cold water at the pause time. The temperature for cooling the copper wire follows the temperature of the copper wire. Due to difference of coefficient of the thermal conductivity between the copper wire and the cold water, the difference of the temperature between the copper wire and the cold water is small at the initial weld time (at the portion of A in FIG. 3). At this time, if the temperature of the cold water is detected, this temperature of the cold water nears the temperature of the copper wire. Accordingly, it is preferable to detect the temperature at the initial weld time.

As mentioned above in detail, the resistance value of the cable and the like is calculated at the temperature at the time of calculation on the basis of detected values of the temperature, the voltage and the welding current, and the calculated resistance value is corrected as the resistance value at the reference temperature. Hence, the corrected resistance value becomes a substantial value which is not affected by the variation of the temperature. The increase of the resistance value due to deterioration of the conductor can be precisely calculated to the practical extent of accuracy. Furthermore, the deterioration of the conductor such as the cable can be precisely decided or judged depending on the range of increase of the corrected resistance value so that the useless replacement of parts can be prevented and the optimum parts can be used. The measuring mechanism can be incorporated in the resistance welding control unit so that the enire arrangement of the resistance welding machine can be compact.

Although the invention has been described in its preferred form with a certain degree of particularity, it is to be understood that many variations and changes are possible in the invention without departing from the scope thereof.

What is claimed is:

1. A resistance measuring mechanism in a resistance welding machine comprising:
    means for detecting the temperature of an exit through which the cold water for cooling cables and the like flows and the temperature of parts of cables;
    means for detecting voltage at a secondary or a primary winding of a welding transformer; and
    means for detecting welding current at the secondary or the primary winding of the welding transformer;
    an analog to digital converter for converting analog data of the detected voltage, temperature, welding current to digital data thereof;
    setting means for storing deterioration data of the cable and resistance value, voltage and welding current at a reference temperature;
    a digital arithmetic operation means for receiving digital data of detected voltage, temperature, welding current from the analog to digital converter and deterioration data of the cable and resistance value, voltage and welding current at a reference temperature from the setting means;
    characterized in that the digital arithmetic operation means calculates the resistance value by correcting the resultant analog data of the detected temperature, voltage, welding current at the detecting temperature for voltage, welding current at the reference temperature and decides deterioration of the cable when the calculated resistance value exceeds a predetermined value.

2. A resistance measuring mechanism in a resistance welding machine according to claim 1, further comprising a a thyristor gate pulse generator connected between the thyristor and the digital arithmetic portion for receiving a signal from the digital arithmetic portion and supplying the same signal to the thyristor for controlling the thyristor for thereby automatically supplying constant current.

3. A resistance measuring mechanism in a resistance welding machine according to claim 1, further comprising an input output portion for displaying the resultant calculated resistance value.

4. A resistance measuring mechanism in a resistance welding machine according to claim 1, further comprising a decision output portion for outputting the result of the deterioration of the cable.

* * * * *